The invention is directed to a seal for roller bearings in motor vehicles, constructed as an electric collar, which is stiffened in the region of its mounting by a metal ring, and provided with two sealing lips which enclose a space filled with grease, the collar being bonded to the stiffening ring by vulcanization.

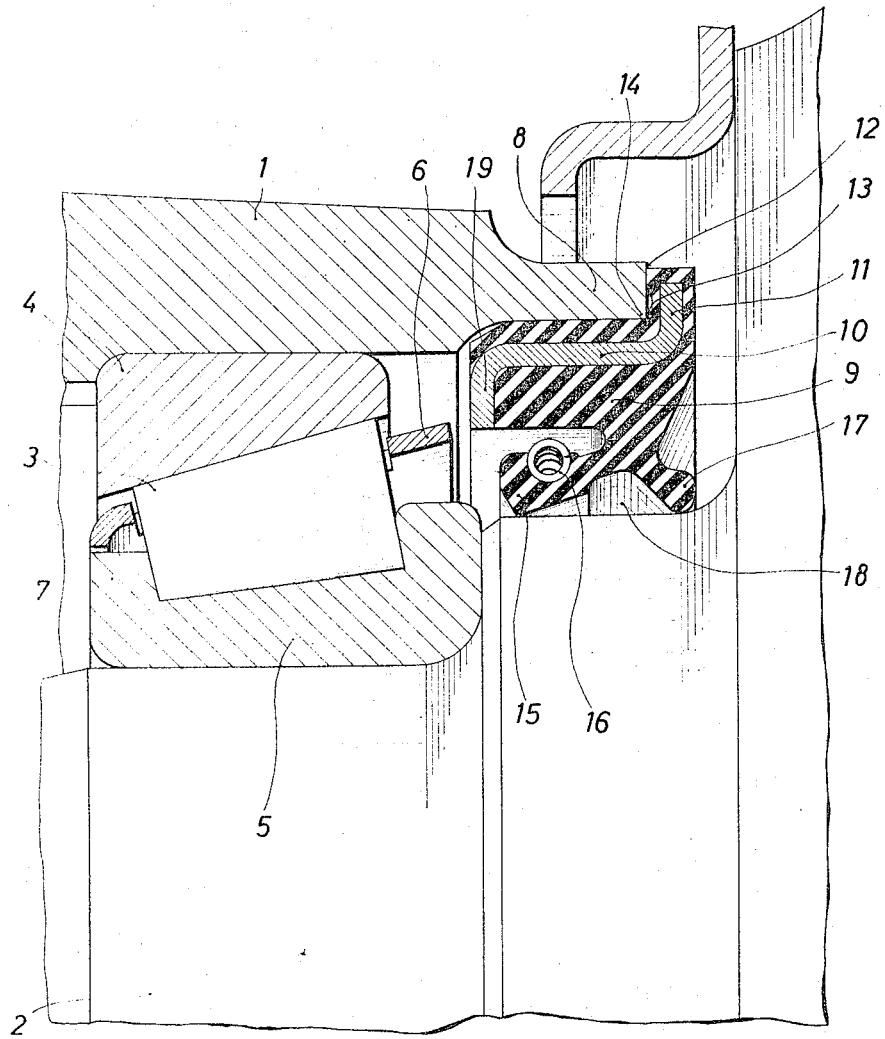
Feb. 28, 1967　　H. DEURING　　3,306,683
SEAL FOR ROLLER BEARINGS IN MOTOR VEHICLES
Filed April 3, 1964
Inventor
Hans DEURING 3,306,683
SEAL FOR ROLLER BEARINGS IN
MOTOR VEHICLES
Hans Deuring, Burscheid, Cologne, Germany, assignor to
Goetzewerke Friedrich Goetze Aktiengesellschaft, Burscheid, Cologne, Germany, a German corporation
Filed Apr. 3, 1964, Ser. No. 357,326
Claims priority, application Germany, Apr. 5, 1963,
G 37,462
7 Claims. (Cl. 308—187.2)

Heretofore in motor vehicle designs the wheels with their wheel hubs have been supported in the axle housing by means of roller bearings, preferably conical or tapered roller bearings. For the sealing of these bearings there previously were used felt or cork rings disposed in the housing, which constructions, however, no longer meet present requirements, as for example, freedom of the bearing from maintenance. The casing or rim of the felt or cork ring was drawn down so far in assembly that in the removal of the wheel hub it also withdrew the inner race of the roller bearing from the shaft along with it. While standard shaft sealing rings have been utilized, because of their relatively large installation dimensions or difficulties in disassembling them, they have been installed only with reluctance.

It is the problem of the invention to replace the wheel bearing seal consisting of felt, cork or rubber by a seal having a collar of elastic material, without foregoing the advantage of the simultaneous withdrawal of the inner race of the roller bearing by the seal during disassembly.

According to the invention it is proposed that for the sealing of the roller bearing there be used an elastic sealing ring, having a collar part which is stiffened by a metal ring whose inside diameter at the bearing side is smaller than the outer diameter of the roller retainer cage of the bearing.

Thus, in the withdrawal of the wheel hub, the roller bearing can also be withdrawn by means of the sealing ring, since the stiffening ring will engage the roller cage during the withdrawal. This, however, assumes that the frictional forces between sealing ring and wheel hub is greater than that between the inner bearing race and the axle or axle housing, or at least when the wheels on the axle are not driven, since otherwise the packing would be pushed out of the wheel hub. The correct proportioning of the parts can be readily determined for any particular case. The sealing lips may also be installed separately and in particular applications supplemental springs 1' may be omitted.

Advantageously the stiffening ring has on the bearing side and inwardly directed flange and on the back or opposite side an outwardly-directed flange, the outer flange being operatively seated on the end face of the wheel hub and thereby determining depth of insertion of the installed seal. The outer flange is preferably completely covered by the collar material, in order to protect it from corrosion. The installation of the seal can be further improved if the surface of the radially extending face of the outer flange facing the wheel hub is annularly grooved, in which arrangement the recess extends to the outer cylindrical peripheral surface of the sealing ring, so that in the mounting of the sealing ring, the adjacent wheel hub edge cannot bear against the face of the flange.

Further, it is proposed that in the installed state of the seal the clearance between the adjacent face of the stiffening ring and the roller cage be so selected that it is less than the corresponding clearance between the front edge of the adjacent sealing lip and the inner race of the roller bearing, so that in the drawing off of the wheel hub there is with certainty avoided any damage to the sealing lip by engagement thereof with the inner bearing race. Finally, the connecting part between the two lips, which enclose a space filled with grease, is made relatively wide, in order to be able to accept the operational torque without tearing off the sealing lips. As is well known, with too long a connecting part, the angle of torque becomes greater and the possibility of the destruction of the sealing lip is undesirably increased.

In the drawing is presented a radial sectional view of a bearing structure, illustrating an example of the invention.

Between the wheel hub 1 and the axle 2 there is installed a bearing comprising conical or tapered rollers 3, an outer bearing race 4 and an inner bearing race 5. The rollers 3 are retained in a cage 6 and abut axially on the collar or shoulder 7 of the inner race 5. The sealing ring 9 is mounted in the neckline projection 8 of the wheel hub 1, by a press fit, the sealing ring being stiffened by a metal ring 10. The outer flange 11 of the stiffening ring 10 is covered with material forming the sealing ring 9, the two being suitably secured together, as for example, by vulcanization, and bears on the surface of the end face 12 of the hub 1. An annular groove or recess 13 in the flange 11 makes possible full insertion during installation of the seal 9 and proper seating of the flange 11 on the end face 12 of the projection 8 without the inner edge 14 of the projection 8 bearing against the flange 11. The sealing lip 15 may be additionally pressed against the axle 2 by a spring 16, while the dust lip 17 prevents the penetration of dirt. The chamber 18 resulting between the lips 15, 16 is filled with grease. The inwardly directed flange 19 of the stiffening ring 10 extends inwardly to such an extent that its inner diameter is less than the greatest diameter of the cage 6 so that upon withdrawal of the wheel hub 1, the inner flange 19 of the stiffening ring 10 extends inwardly to such an extent that its inner diameter is less than the greatest diameter of the cage 6, so that upon withdrawal of the wheel hub 1, the inner flange 19 of the seal bears against the cage 6, whereby the inner bearing race 5 is also withdrawn from the axle 2 or associated axle structure without damage to the lip 15.

Changes may be made within the scope and spirit of the appended claims which define what is believed to be new and desired to have protected by Letters Patent.

I claim:
1. An assembly comprising; a wheel hub, a shaft, a roller bearing, and a seal for said roller bearing, said bearing having an outer race and a grooved inner race and tapered rollers between said races seated in the groove in said inner race and a roller cage intermediate said races retaining said rollers, said outer race being mounted in said wheel hub and said inner race being mounted on said shaft, said seal being arranged between said wheel hub and said shaft and at that end of the outer race through which the inner race and rollers and cage are withdrawn as a unit from said outer race when the bearing is disassembled by withdrawing of said wheel hub together with said outer race from said shaft, said seal comprising an annular collar of resilient material having in the radially inner region on the shaft side a pair of axially spaced annular sealing lips slidably engaging said shaft and adapted to retain a body of lubricant around the shaft and between said lips, a cylindrical metal stiffening ring imbedded in said collar in a radially outer region thereof having a first radially outwardly extending flange at one end and a second radially inwardly extending flange at the other end, the outer surface of said collar being cylindrical in the region of the cylindrical stiffening ring, said collar being press fitted into a cylindrical bore in said wheel hub with the said other end thereof foremost following the insertion into the wheel hub of the outer race of the bearing, the inner diameter of said second flange being smaller than the outer diameter of said cage, so that upon withdrawal of said hub and outer race, the said second flange will engage said cage and prevent the inner race from being drawn through and thereby damaging the seal lips.

2. A seal according to claim 1 in which said first flange seats on the end of the wheel hub and thereby locates the seal axially in the wheel hub.

3. A seal according to claim 2 in which said ring is so imbedded in said collar that at least the radially outer surface of said ring and the hub side of said first flange has a layer of the material of said body of substantially uniform thickness thereon.

4. A seal according to claim 3 in which the radially inner region of the layer of material on the hub side of said first flange is provided with annular groove means.

5. A seal according to claim 1 in which the axial distance from the second flange to said cage is smaller than the axial distance from said inner race to the one of said lips nearest thereto when the bearing and seal are assembled in the hub.

6. A seal according to claim 5 in which said radially inner and radially outer regions of said collar are in the form of substantially coextensive radially spaced cylinders, and an annular radial neck portion axially shorter than said radially inner and radially outer regions extended between said regions and integrally connected to said regions.

7. A seal according to claim 6 in which said neck portion is near the end of said seal which is remote from the bearing end thereof and a spring is provided seated on the radially outer surface of said radially inner region near the bearing end of said seal and within the axial range of the sealing lip at the bearing end of said seal.

References Cited by the Examiner

UNITED STATES PATENTS

| | | | |
|---|---|---|---|
| 2,692,785 | 10/1954 | Reynolds | 277—183 |
| 2,871,037 | 1/1959 | Johnson et al. | 277—153 |
| 2,873,153 | 2/1959 | Haynie | 277—153 XR |
| 2,992,027 | 7/1961 | Wright et al. | 277—58 |
| 3,028,203 | 4/1962 | Lund et al. | 277—181 XR |
| 3,166,362 | 1/1965 | Slaght | 308—187 XR |

SAMUEL ROTHBERG, *Primary Examiner.*